United States Patent [19]

Lietar

[11] 4,040,746

[45] Aug. 9, 1977

[54] OPTICAL CONGRUENCE COMPARATOR

[75] Inventor: Christian Lietar, Morges, Switzerland

[73] Assignee: Robert Bosch GmbH, Stuttgart, Germany

[21] Appl. No.: 707,322

[22] Filed: July 21, 1976

[30] Foreign Application Priority Data

Aug. 21, 1975 Germany .............................. 2537153

[51] Int. Cl.² ........................................... G02B 21/18
[52] U.S. Cl. ...................................... 356/168; 350/30
[58] Field of Search ...................... 356/168; 350/30, 33

[56] References Cited

U.S. PATENT DOCUMENTS

| | | | |
|---|---|---|---|
| 2,950,649 | 8/1960 | Horn | 350/30 |
| 3,667,848 | 6/1972 | Percival | 350/30 |

Primary Examiner—John K. Corbin
Assistant Examiner—R. A. Rosenberger

Attorney, Agent, or Firm—Flynn & Frishauf

[57] ABSTRACT

To prevent spurious distortion of the image upon mechanical distortion of a cross slide upon movement of the cross slide, a slide carrier is arranged to support the objects to be compared in superposed relation; a microscope optic and deflection optics form superimposed images of the respective objects, the microscope optics including two channels which have objective planes parallel to the imaging planes for measuring the objects. In accordance with the invention, the focal length of the microscope objective in one channel is equal to one-half the distance of the superimposed corresponding elemental areas of the objects to be compared, the optic generating an image of the areas to be compared which is at, or close to infinity. A plane mirror is rigidly connected to the carrier, the mirror plane thereof extending parallel to the imaging planes, so that small rotary distortion of the carrier will not interfere with congruence of corresponding elemental areas.

7 Claims, 5 Drawing Figures

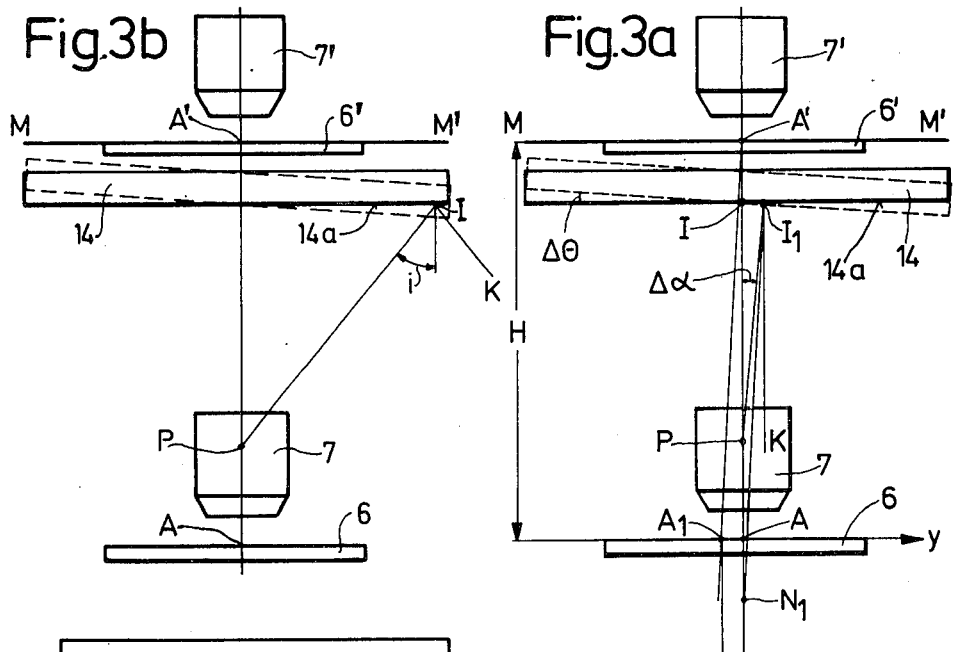

OPTICAL CONGRUENCE COMPARATOR

The present invention relates to an optical congruence comparator to compare the optical outline, in a flat plane, of two objects. Optical comparators have been proposed in which the object to be compared, usually a "standard" and a test object, are placed on a cross slide table. Due to the Abbé principle relating to optical measurements, it is not possible to make accurate measurements transverse to the guide direction of a slide table.

Various proposals have been made to avoid the introduction of measuring errors due to inaccuracies in the mechanical guide, and to make measurements independent of such inaccuracies, for example by using an optical system in which both objects to be compared are, in the same scale, imaged in a common plane such that one is superimposed on the other. Such an image, which reminds one of a double exposure, is then microscopically scanned. The miscroscope has a measuring-type ocular. Such locally scanned comparisons are independent of mechanical inaccuracies and wear of the guiding mechanism*. This principle can be used, theoretically, also with large test objects. The optical system, however, becomes complex if the area to be investigated is great. In such cases, the optical system also becomes very large and expensive.

* corresponding to U.S. Pat. No. 3,817,626

It is an object of the present invention to provide an optical comparator apparatus in which coordinate regions of the objects to be compared in a common plane field are imaged so as to be superimposed and, by optical means, to compensate for necessarily present inaccuracies of the mechanical guidance so that comparison of two objects can be achieved over a wide field.

SUBJECT MATTER OF THE PRESENT INVENTION

Briefly, a slide carrier supports the objects in superimposed alignment in such a manner that coordinate points or elemental areas of the objects are located on a line which is perpendicular to the plane of investigation of the objects. By means of microscope optics, superimposed images are generated. Two objective channels are used, the objective planes of which are parallel to the respective imaging planes of the two objects to be investigated. The focal length of the microscope objective in one channel is equal to half the distance of the two elemental areas or test points to be compared. The elemental area or test point to be examined is imaged so that the rays are essentially parallel—that is, to generate an image essentially at infinity. The microscope objective further cooperates with a plane mirror which is rigidly secured to the cross slide. The mirror has a mirror surface which is parallel to the imaging planes of the elemental areas. Small rotational movement of the slides thus will not interfere with coincidence of corresponding points in the superposed microscope images.

The invention will be described by way of example with reference to the accompanying drawings, wherein:

FIGS. 3a and 3b are fragmentary schematic side views in which relationships are indicated as explained in the specification and desirable for an understanding of the subject matter; and FIG. 4 is a schematic side view, partly in section, of another embodiment of the invention.

Figure 1:
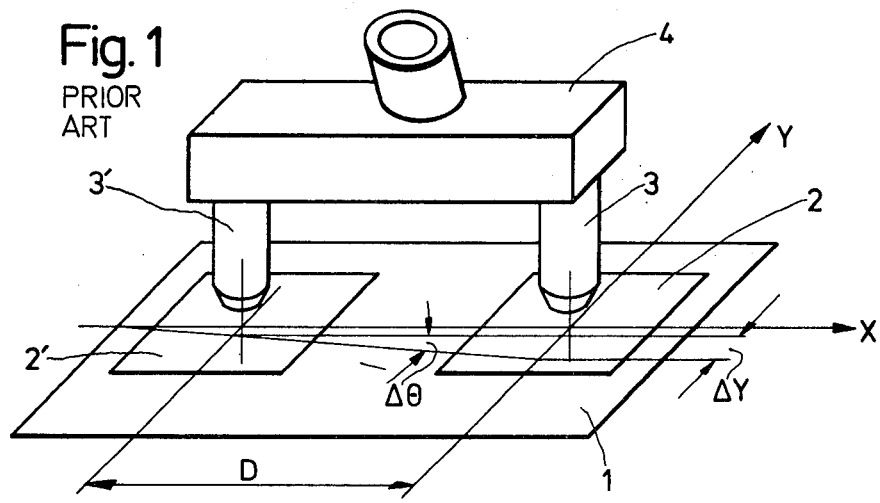
FIG. 1 is schematic showing of an optical comparator in accordance with the prior art.

the effect of the Abbé principle, when comparing two flat objects in a plane, as is customary in commercial comparators, will be explained in connection with FIG. 1. The objects 2, 2' to be compared are located adjacent each other on a cross slide 1 which can move in two mutually perpendicular directions $x$ and $y$. Object 2 may be a standard, and object 2' a test sample.

A microscope 4 has two input channels and thus has two objectives 3, 3' associated with the respective objects 2, 2'. The microscope objectives 3, 3' generate images of equal size which are superimposed on each other in the imaging plane of the object of the ocular when homologous regions of the test objects 2, 2' are imaged through the objectives 3, 3'.

The optical axes of the two microscopes 3, 3' define a plane. The track of this plane in the plane in which the test samples are located is, in the example shown, parallel to the $x$ axis. Upon movement of the cross slide table 1 parallel to the $x$ direction, measurements can be made without any difficulty since small rotary movements, such as yawing excursions, or oscillations of the cross slide table 1 pass through an axis perpendicular to the test plane and enter into the measurement of the $x$-coordinate only with higher-order coefficients.

If measurements are made in the $y$ direction, perpendicular to the $x$ direction, even small rotary excursions will have a substantially greater influence. The two channels will be subjected to different lateral shifts.

Various mathematical relationships will be explained; they are listed on the attached Table.

Small spurious rotary movements in the $y$ direction result in differences which, in a first approximation, are given by the relationship (1), in which D is the distance of the optical axes of the two microscope objectives 3, 3' and $\Delta\theta$ is the small rotary angle through which the cross slide has moved. The error $\Delta y$ increases as the distance D increases. Thus, if test objects 2, 2' have substantial lateral extent, so that the axes of the objectives 3, 3' have to be widely separated, the error becomes noticeable and bothersome.

Figure 2:
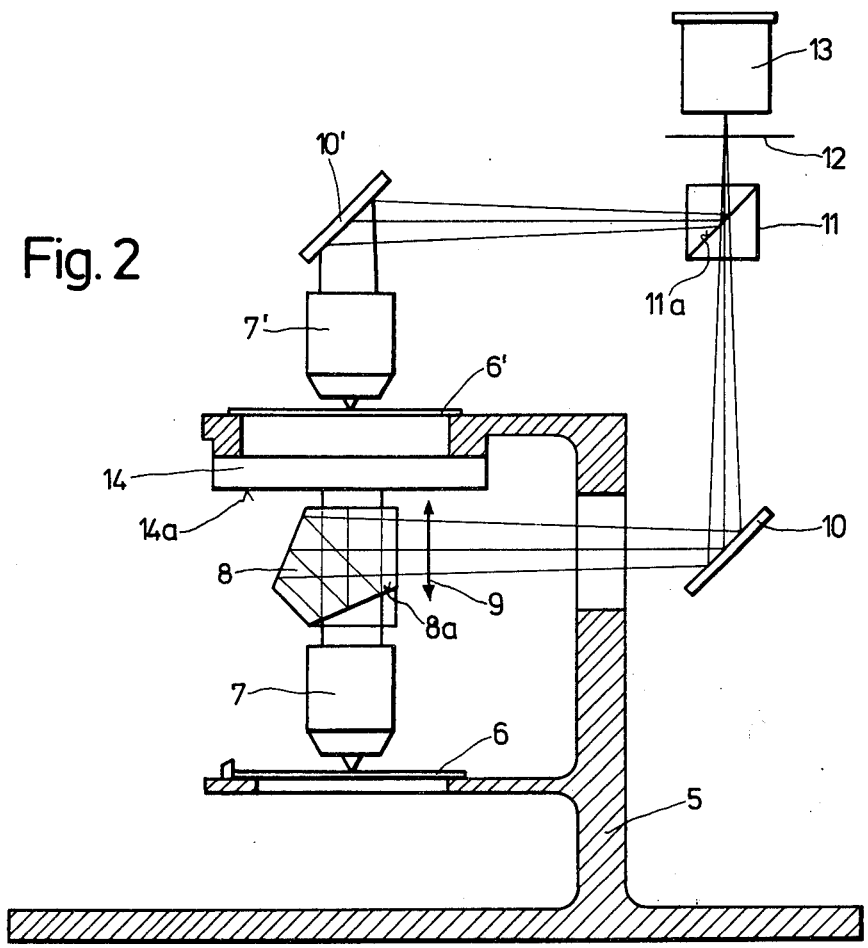
FIG. 2 is a first schematic side view, partly in section, of an embodiment of the present invention.

The error can be minimized in accordance with the invention; referring now to FIG. 2, two test objects 6, 6' are located on a cross slide 5 above each other. If absolute measurements are to be taken on one of the test objects, for example test object 6, then the second test object 6' can be replaced by a measuring grid.

The cross slide 5, besides carrying the test objects 6, 6' to be compared with each other similar to the comparison of objects 2, 2', further supports a plane mirror 14 having a downwardly directed mirror surface 14a. The measuring and observation microscope is fixed in space, for example by being attached to a frame of the apparatus (not shown) and includes microscope objectives 7, 7', deflection mirrors 10, 10', a pentaprism 8, an auxiliary objective 9 (shown only schematically), a beam splitter 11 and an ocular 13. The focal plane of ocular 13 is schematically indicated at 12. The optically effective elements within the light beams in the microscope are all—except for the plane mirror 14—fixedly and rigidly connected together, for example by being attached to the frame of the apparatus.

The plane mirror 14 is secured to the cross slide 5 in such a manner that the mirror surface 14 moves in the plane of movement of the cross slide when the cross slide is shifted on a support surface (not shown).

Pentaprism 8 and the beam splitter 11 each are formed with respective surfaces 8a and 11a which partly pass and partly reflect image rays.

The ocular 13 of the microscope generates superposed enlarged images of homologous portions of the test objects 6, 6' in the focal plane 12 thereof. The areas may also be termed elemental areas or test zones.

Pure translatory movement of the cross slide 5 cannot lead to measuring errors in the illustrated arrangement, since both test objects 6, 6' shift by the same amount in the same direction. It is, however, possible that the cross slide 5 is additionally subjected to tipping or tilting movement; this would cause displacements of the test objects 6, 6' by different distances.

Each movement in three-dimensional space can be resolved in rotation and translation or in three translations parallel to the three perpendicular axes and three rotations about the axes of any desired Cartesian system. Pure translation does not cause measuring errors in the apparatus in accordance with the present invention; it must now be shown that rotation about three given, mutually perpendicular axes does not interfere with measuring accuracy.

Discussion with reference to FIGS. 3a and 3b (collectively FIG. 3), and operation: FIG. 3 illustrates those elements, schematically, which are necessary to explain the inventive concept.

Point A of test object 6, and point A' of test object 6' define homologous points of the test objects, that is, points which, in the focal plane 12 of ocular 13, are superimposed when the cross slide 5 is in a first, starting position. The optical axes of the microscope objectives 7 and 7' are in congruent alignment and are perpendicular to the mirror surface 14a. Thus, rotation about the axis A-A' does not affect congruence of the images of points A and A' in the focal plane 12. Rotation about this first axis, thus, does not introduce any measuring error.

The second possible rotary axis is one through point A' perpendicular to the plane of the drawing.

Let $\Delta \theta$ be the angle of spurious rotation of the slide 5 about this second axis. Point A' remains on the optical axis of the microscope objective 7'. Thus, its image in the plane 12 of the ocular 13 remains fixed. Point A, however, has shifted in the plane of the test object 6 towards point $A_1$. It must now be investigated if the image of point $A_1$ will likewise be on the optical axis of the ocular 13.

The microscope objective 7 is so set that the imaging plane of the test object is imaged at infinity. Thus, upon leaving the microscope objective 7, rays derived from point $A_1$ are parallel. The common direction of these rays characterizes the position of the intermediate image in infinity of the point $A_1$. Let the main beam or ray $PI_1$ be selected as representative of the entire bundle of parallel rays.

The main beam $PI_1$ forms an angle $\Delta \alpha$ with the main beam PI from point A. The main beam PI corresponds to the optical axis of the microscope objective 7. This angle $\Delta \alpha$ is defined in relationship (2), in which $f$ is the focal length of the microscope objective 7, and $\Delta y$ is defined in relationships (3), wherein H is the vertical distance of corresponding, homologous points A and A'. Solving, one obtains relationship (4).

The pentaprism does not change the direction of the beams which come from microscope objective 7 and impinge on the plane mirror 14. Pentaprism 8 may, therefore, be ignored for purposes of the present discussion.

The main beam $PI_1$ impinges mirror 14 rotated by the angle $\Delta \theta$, which angle is formed also by a line $I_1 N_1$ in point $I_1$ perpendicular to the mirror with the main beam PI of point A. If the perpendicular line would also be the half-angle direction of the angle $PI_1K$, in which $I_1K$ is parallel to IA, then, after reflection at the mirror surface 14a, the direction of the image of the point $A_1$ would be precisely the direction in which the point A would be found, imaged in infinity, before the slide 5 was tipped by the angle $\Delta \theta$. Under this condition: the perpendicular to the mirror is exactly equal to half-angle direction of $PI_1K$, the bundle of rays reflected from the mirror surface 14a will fall on the semitransparent mirror surface 8a of pentaprism 8 in parallel to A, A' direction. Thus, the image of the point $A_1$ in the focal plane 12 of the ocular 13 will be at that point where the image of the point A was found before the slide 5 was tipped by the angle $\Delta \theta$.

Relationship (5) must be met and then, solving for the focal distance from equations (4) and (5), relationship (6) obtains; expressed verbally, relationship (6) means that the focal distance of the microscope objective 7 must be half of the vertical distance between corresponding points A and A', that is, between the respective homologous elemental areas.

The same relationship for the focal length $f$ of the microscope objective 7 can be obtained if the second axis is not selected to be perpendicular to the plane of the drawing, but rather is placed in the plane of the drawing. FIG. 3 illustrates such an axis with M-M'. The rotation angle about the axis M-M', not shown in the drawing, is referred to in the following discussion as angle $\Delta \beta$. If the relationship (6) is met, rotation about three axes, perpendicular to each other and passing through point A' will have no influence on measuring accuracy, since such movement does not affect coincidence at the focal plane 12 of the ocular on the optical axis thereof.

If the point A is not at the optical axis of the microscope objective 7, then the beam PI is no longer parallel to A, A'; it will, rather, have an angle of incidence $i$ on the mirror surface 14a (see FIG. 3b). Upon rotation of the mirror 14 about the tipping angle $\Delta \theta$, the main beam is rotated by an angle of $2 \Delta \theta$ upon reflection. An additional rotation $\Delta \beta$ about the axis M, M' results in rotation of the beam IK by an angle $2 \Delta \beta \cos i$. If the angle $i$ is small, $\cos i$ is approximately equal to unity ($\cos i = 1$). Even if the angle $i = 18°$, $\cos i$ is still 0.95, so that even at a substantial field angle, the correctness in the x-direction is still 95%, and the error practically negligible.

Pure translation does not have any influence on the accuracy of measurement; thus, objects 6 and 6' can be compared with each other even if they are not flat. Adjustment of the sharpness of image by moving of all the microscope with respect to the slide 5 does not influence the accuracy of measurement. A device built in accordance with this invention is particularly applicable and useful if dimensions on one body have to be checked with respect to those of another in planes which are respectively parallel to each other.

The apparatus has the additional advantage that measurements can be made in the x and y dimensions without additional adjustments, which is not possible in the commercial optical comparators due to the aforementioned Abbé conditions without substantial loss in accuracy.

Temperature changes do not, or only insignificantly affect the accuracy of measurement of the apparatus as described. The supports and stop elements for the objects to be compared can be accurately coordinated with respect to each other to be in accurate vertical alignment and will retain their relative position in the measuring plane, even upon change in temperature. The coincidence of corresponding points of the test objects 6, 6' remains even though temperature may change.

The enlargement of the microscopes may be suitably selected. Thus, it is possible to exchange the microscope objective 7' against another one. Only one of the microscope objectives, here objective 7, must meet the requirement of relationship (6) so that it cannot be exchanged. In order to obtain the same scale of imaging in both channels, however, the auxiliary objective 9 must then be changed or an afocal element must be inserted between the pentaprism 8 and the auxiliary objective 9.

Embodiment of FIG. 4, in which similar elements operating similarly have been given the same reference numerals: A reversal of the image before and after the plane mirror 14 is required, which reversal is effected by two Porro prism systems of first order 15a, 15b. This arrangement permits examination not only of two theoretically equal test objects but also testing of two objects which are theoretically the reverse or negative of each other, for example a photographic negative and an opaque copy. This is of particular importance in the manufacture and testing of integrated circuits. The microscope objective 7' in FIG. 4 operates with transmitted light; microscope objective 7'' operates with reflected light. Choice of the channel is effected by means of a mirror 16a which can be changed to a position 16b, as shown in broken lines.

Various changes and modifications may be made within the scope of the inventive concept.

TABLE $$\Delta y = D \cdot \Delta \theta \quad (1)$$

$$\Delta \alpha = \frac{\Delta y}{f} \quad (2)$$

$$\Delta y = \overline{AA_1} = H \cdot \Delta \theta \quad (3)$$

$$\Delta \alpha = \frac{H}{f} \cdot \Delta \theta \quad (4)$$

$$\Delta \theta = \frac{\Delta \alpha}{2} \quad (5)$$

TABLE-continued $$f = \frac{H}{2} \quad (6)$$

I claim:
1. Optical congruence comparator to compare the outlined dimensions, in respective image planes of two objects (6, 6') comprising
    a slide carrier (5) supporting said objects (6, 6') in superposed alignment with respect to a line perpendicular to said planes;
    a microscope optic (7-10; 7'-10', 10''; 11-13) forming superposed images of said respective objects and including two objective channels (7, 7') having objective planes parallel to said imaging planes,
    wherein the focal length of the microscope objective in one channel (7) is equal to one-half the distance (H) of separation of corresponding elemental area (A, A'), zones or points of the objects to be compared and the microscope optic generates an image of the areas, zones or points to be compared at, or close to essentially infinity; and
    a plane mirror (14) fixedly connected to said carrier (5) and having a mirror plane (14a) which extends parallel to said imaging planes so that small rotary distortion of the carrier will not interfere with congruence of corresponding elemental areas, zones or points of the respective objects (6, 6') in the superposed microscope images.
2. Comparator according to claim 1, wherein an optical reversal system (15a, 15b) is provided, included in one channel of the channels.
3. Comparator according to claim 2, wherein the optical reversal system comprises a Porro-prism of first order (15a, 15b).
4. Comparator according to claim 1, wherein the mirror plane (14a) is perpendicular to the optical axis of the associated objective (7) of the microscope optic.
5. Comparator according to claim 1, further comprising optical enlarging-reducing means (9) included in the channel of the microscope optic which has said plane mirror (14) fixedly connected to the carrier (5) therein to change the imaging scale of the microscope optic.
6. Comparator according to claim 5, wherein the enlarging-reducing optics (9) comprises an auxiliary objective (9) having a variable focal length.
7. Comparator according to claim 5, wherein the enlarging-reducing optics comprises auxiliary objectives of variable focal length selectively positionable in the optical path of said respective channel.

* * * * *